United States Patent [19]

Hamada et al.

[11] Patent Number: 4,790,087
[45] Date of Patent: Dec. 13, 1988

[54] LICENSE PLATE ASSEMBLY FOR MOTORCYCLES

[75] Inventors: Kenji Hamada; Masato Iwakura, both of Saitama, Japan

[73] Assignee: Honda Giken Kogyo Kabushiki Kaisha, Tokyo, Japan

[21] Appl. No.: 896,509

[22] Filed: Aug. 14, 1986

[30] Foreign Application Priority Data

Aug. 19, 1985 [JP] Japan ............................ 60-126190[U]

[51] Int. Cl.$^4$ .............................................. G09F 13/02
[52] U.S. Cl. .......................................... 40/204; 40/590
[58] Field of Search ................. 40/590, 204, 200, 205, 40/556

[56] References Cited

U.S. PATENT DOCUMENTS

| 1,036,984 | 8/1912 | Erickson | 40/204 |
| 1,419,745 | 6/1922 | Mendenhall | 40/204 |
| 1,905,568 | 4/1933 | Radke | 40/204 |
| 2,241,647 | 5/1941 | Simon | 40/204 |
| 3,921,323 | 11/1975 | Petty | 40/204 |
| 4,077,145 | 3/1978 | Smoczynski | 40/590 |

FOREIGN PATENT DOCUMENTS 665966 2/1952 United Kingdom ................. 40/204

Primary Examiner—Gene Mancene
Assistant Examiner—Cary E. Stone
Attorney, Agent, or Firm—Bogucki, Scherlacher, Mok & Roth

[57] ABSTRACT

A license plate assembly on a motorcycle includes a stay by which a license plate is erected from a rear cover over a rear wheel behind a seat, and an illumination device embedded in the rear cover below and behind the license plate for upwardly emitting a light beam to illuminate the license plate.

3 Claims, 4 Drawing Sheets

LICENSE PLATE ASSEMBLY FOR MOTORCYCLES

BACKGROUND OF THE INVENTION

1. Field of the Invention

The present invention relates to a license plate assembly for use on motorcycles.

2. Description of the Relevant Art

License plates for motorcycles are normally mounted on a rear portion of the rear fender of the motorcycles.

Conventional motorcycle license plates are likely to be smeared with mud splashed while the motorcycle is running since the license plates depend substantially vertically from the rear portion of the rear fender. Further, motorcycle license plates have heretofore been illuminated by an illumination device which projects rearwardly above the license plate.

SUMMARY OF THE INVENTION

It is an object of the present invention to provide a license plate assembly which includes a license plate that is highly resistant to being smeared with mud or the like and an illumination device of aesthetically appealing appearance for illuminating the license plate.

According to the present invention, the above object can be achieved by a license plate assembly on a motorcycle, including a stay by which a license plate is erected from a rear cover of the motorcycle behind a seat, and an illumination device embedded in the rear cover below and behind the license plate for illuminating, from below, the license plate.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
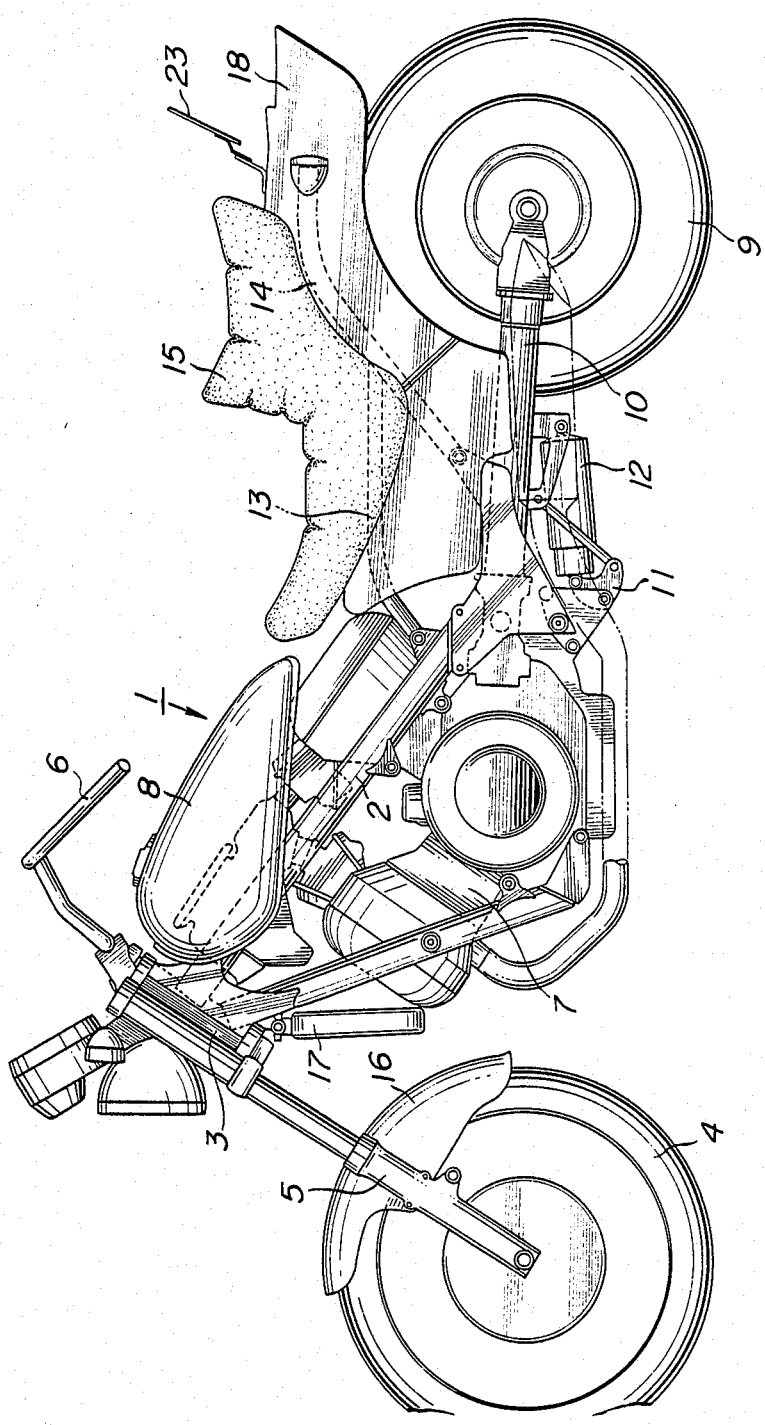
FIG. 1 is a side elevational view of a motorcycle incorporating a license plate assembly according to an embodiment of the present invention.

As shown in FIG. 1, a motorcycle 1 includes a front fork 5 on which a front wheel 4 is rotatably supported and which is steerably supported by a head tube 3 on a front end of a motorcycle frame 2. The motorcycle 1 also includes an engine 7 supported by the frame 2 at a front lower position, a fuel tank 8 supported by the frame 2 at a front upper position, and a vertically swingable rear fork 10 extending rearwardly from a rear lower end of the frame 2. A rear wheel 9 is rotatably supported by the rear fork 10. A rear cushioning unit 12 is interposed between the rear fork 10 and the frame 2 through a link mechanism 11. A seat rail 14 extends rearwardly from the frame 2 and is also coupled by a rear stay 13 to the frame 2, with a seat 5 supported on the seat rail 14. The motorcycle 1 further includes a front fender 16 supported by the front fork 5 and a radiator 17 supported by the frame 2 and located in front of the engine 7. A handlebar 6 is connected to rotate the fork 5 for steering the motorcycle 1.

Figure 2:
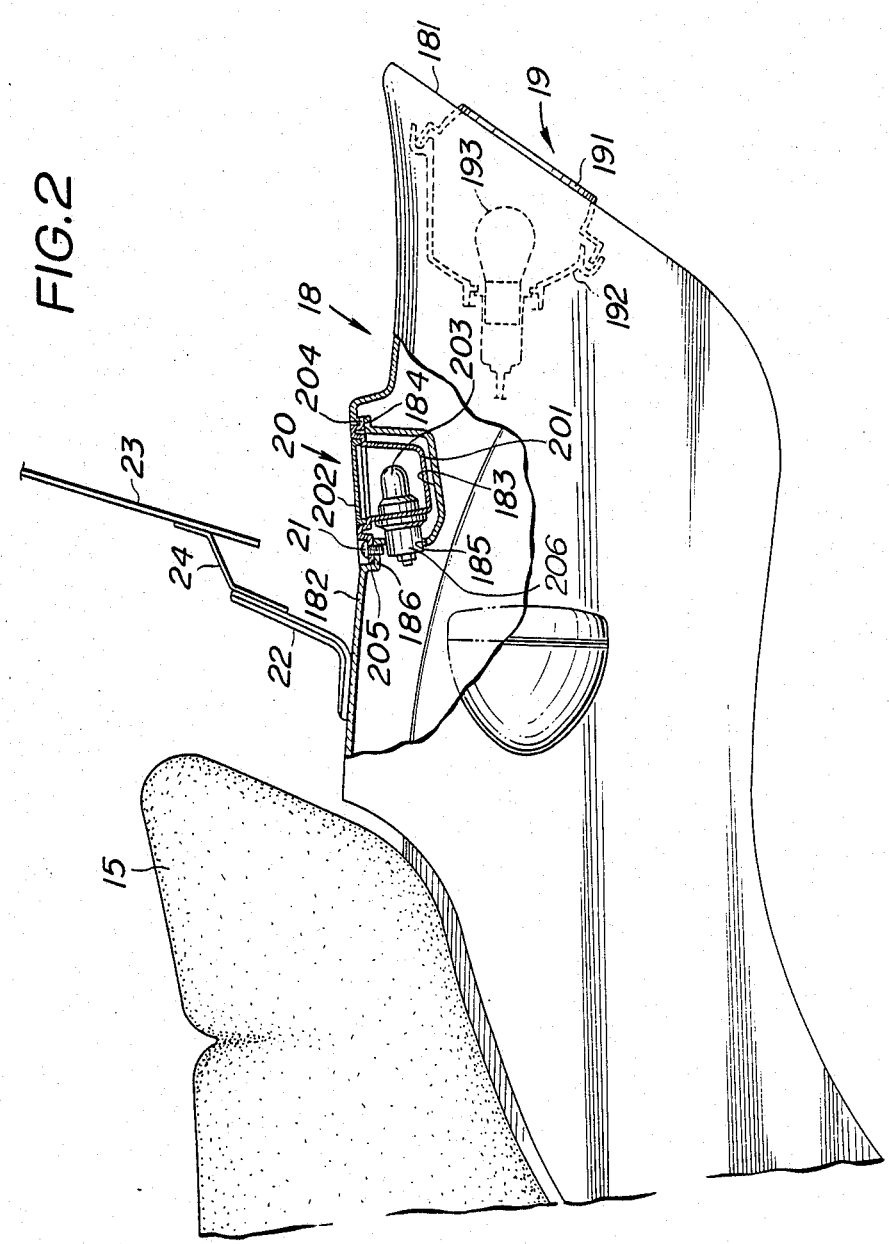
FIG. 2 is an enlarged fragmentary side elevational view, partly in cross section, of the license plate assembly shown in FIG. 1.

A rear cowl 18 is disposed above the rear wheel 9 and includes a rear end wall 181 (FIG. 2) on which a tail light unit 19 is mounted. As illustrated in FIG. 2, the rear light unit 19 comprises a colored lens 191 exposed on the rear end wall 181, a housing 192 disposed in the rear end wall 181, and a lamp 193 accommodated in the housing 192.

The rear cowl 18 includes an upper panel 182 having an upwardly opening cavity 183 positioned behind the seat 15 and including a recess 184 defined in an upper rear end of the cavity 183. The cavity 183 also includes an opening 185 defined in a front wall portion thereof and a step 186 positioned above the opening 185. A lamp unit 20 for illuminating a license plate comprises an upwardly opening lamp housing 201 loosely accommodated in the cavity 183, a transparent lens 202 closing the upper open end of the lamp housing 201, and a lamp 203 disposed in the lamp housing 201. The lamp housing 201 includes a locking member 204 on its rear end and a flange 205 on its front end. For assembly, the locking member 204 is inserted into the recess 184 while placing the lamp housing 201 into the cavity 183, and then the flange 205 is fastened by a screw 21 to the step 186, thereby fixedly positioning the lamp housing 201 in the cavity 183. The lamp 203 has a socket 206 projecting from the lamp housing 201 toward the seat 15 and having a front contact end positioned out of the opening 185 for connection to a lead, not shown. The lens 202 is exposed on the upper panel 182 of the rear cowl 18.

Figure 3:
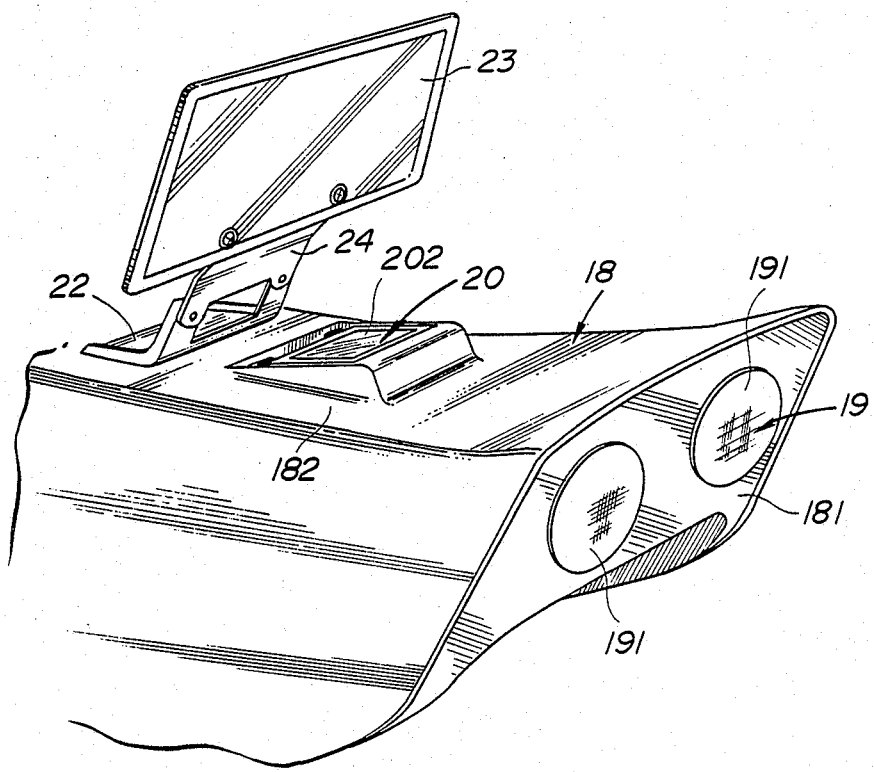
FIG. 3 is a fragmentary perspective view of the license plate assembly of FIG. 2.

As shown in FIGS. 2 and 3, a stay 22 of substantially L-shaped cross section is substantially vertically mounted on a front end portion of the upper panel 182 in front of the lamp unit 20. An erected license plate 23 is supported on a stay 24 joined to the stay 22 such that the lens 202 of the lamp unit 20 is positioned substantially below and behind the front face of the license plate 23. Therefore, a light beam is upwardly emitted from the lamp unit 20 to illuminate the front face of the license plate 23 from below.

Figure 4:
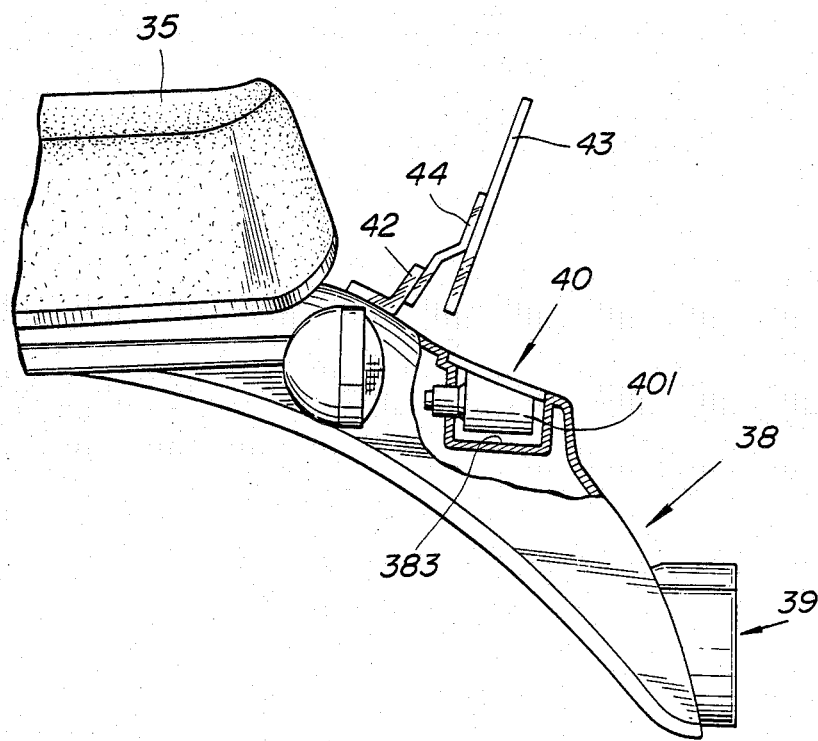
FIG. 4 is a fragmentary side elevational view of a license plate assembly according to another embodiment of the present invention.

According to another embodiment shown in FIG. 4, a tail light unit 39 is mounted on the rear end of a rear fender 38 lying above the rear wheel, and a cavity 383 is defined in the rear fender 38 behind a seat 35. A lamp unit 40 for illuminating a license plate includes a lamp housing 401 placed in the cavity 383. A license plate 43 supported by a stay 44 is mounted by a stay 42 on the rear fender 38. The lamp unit 40 includes a lens positioned below and behind the front face of the license plate 43.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A license plate assembly on a motorcycle having a front and a rear and including a rear cover and a seat, the assembly comprising:

a rear light unit disposed at the rear end of said rear cover;

a license plate having a display surface directed substantially rearwardly of said motorcycle;

a stay by which said license plate is erected rearward of said seat from said rear cover; and an illumination device disposed separately from said rear light unit and embedded into a cavity formed in said rear cover below and rearward of said license plate, said illumination device having a lamp for upwardly emitting a light beam to directly illuminate said display surface.

2. A license plate assembly according to claim 1, wherein said rear cover comprises a rear cowl including a rear fender.

3. A license plate assembly according to claim 1, wherein said rear cover comprises a rear fender.

* * * * *